United States Patent

[11] 3,566,032

[72] Inventors John T. Carbone
Englishtown, N.J.;
George Parker, New York, N.Y.

[21] Appl. No. 786,176
[22] Filed Dec. 23, 1968
[45] Patented Feb. 23, 1971

[73] Assignee Bell Telephone Laboratories, Incorporated
Murray Hill, Berkeley Heights, N.J.

[54] DIRECT-CURRENT DATA SET ARRANGED FOR POLAR SIGNALING AND FULL DUPLEX OPERATION
9 Claims, 1 Drawing Fig.

[52] U.S. Cl. .......... 178/59
[51] Int. Cl. .......... H04l 5/14
[50] Field of Search .......... 178/49, 58, 59, 60; 307/237; 328/135; 325/38 (A)

[56] References Cited

UNITED STATES PATENTS 3,267,459 8/1966 Chomicki et al. .......... 325/38(A)

*Primary Examiner*—Kathleen H. Claffy
*Assistant Examiner*—David L. Stewart
*Attorney*—R. J. Guenther and Kenneth B. Hamlin

ABSTRACT: The direction and magnitude of the cumulative polar loop current on a full duplex two-wire line are monitored by a three-level detector which determines when the incoming and outgoing current signals are both marking, both spacing, or concurrent marking and spacing. An appropriate one of the detector outputs is selected depending on whether an outgoing marking or spacing signal is being transmitted enabling the identification of incoming signals. Detection of the direction of loop current is accomplished by a pair of emitter-coupled transistor signal slicers. A third transistor signal slicer, whose emitter is coupled via a diode to the common emitter circuit, detects for the high magnitude current produced when both data sets generate spacing currents.

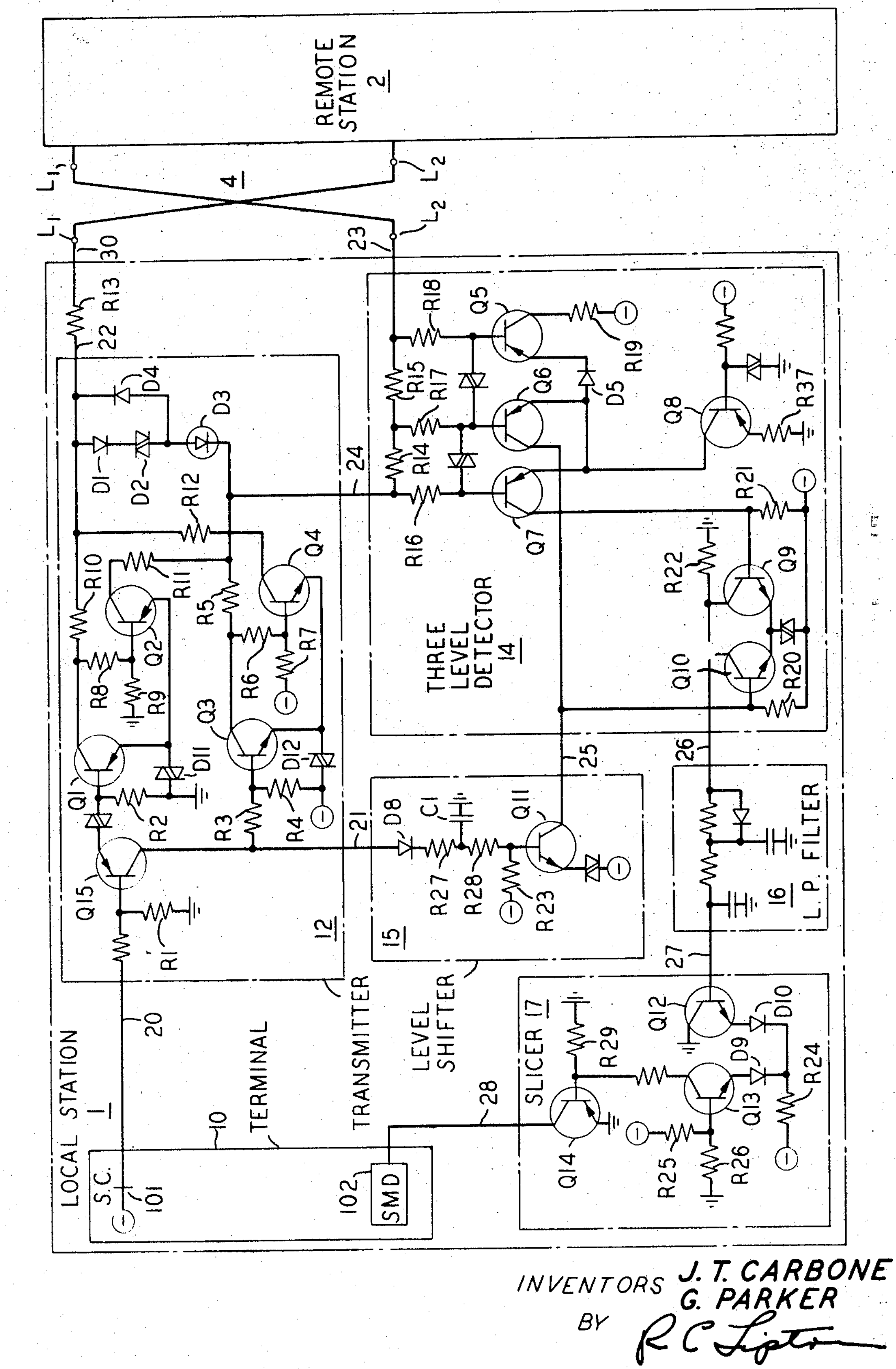
INVENTORS J. T. CARBONE
G. PARKER
BY R C Lipton
ATTORNEY

DIRECT-CURRENT DATA SET ARRANGED FOR POLAR SIGNALING AND FULL DUPLEX OPERATION

FIELD OF THE INVENTION

This invention relates to full duplex polar loop signaling over two-wire lines and, more particularly, to data sets arranged for direct-current signaling and full duplex operation.

DESCRIPTION OF THE PRIOR ART

Low speed data sets communicating over short and medium haul telephone lines may employ voice frequency or direct-current signaling techniques. The direct-current signaling can involve alternate current-no current signals or polar current signals, the latter technique being produced through reversal of a signaling battery wherein current circulates in one direction, such as clockwise, around the two-wire loop of the telephone line when marking current is being transmitted and circulates in the other direction when spacing current is being transmitted. This type of signaling is attractive for medium haul loops since the data sets do not require expensive reactive components necessary for voice transmission or do not require the high current signals, which may develop crosstalk, necessary for on-off type signaling.

To recover the polar current signals on the two-wire loop, each data set may utilize a monitor which detects the magnitude and direction of the current on each wire. The current flow on each leg is compared to obtain the direction of the circulating current in the loop and, to thus determine the signal applied thereto. In addition, the magnitude of the circulating current may be monitored to detect whether the signal level falls below a permissible threshold. One arrangement for recovering signals in this manner is disclosed in the copending application of J. T. Carbone, O. F. Gerkensmeier and G. Parker, Ser. No. 566,564, now U.S. Pat. No. 3,505,475, which was filed on July 20, 1966.

If full duplex signaling is provided on the line, in accordance with one form of the practice, the magnitude for the battery supply providing spacing current exceeds the magnitude for the battery supply providing marking current. Thus, when one set is sending spacing and the other is sending marking, the spacing current overcomes the opposing marking current and the direction of the circulating current indicates that a spacing signal is being applied to the line. When both sets are sending spacing, the two currents are aiding and the magnitude of the spacing current is over twice the magnitude of the current which circulates when only one set sends spacing. It is obvious that the determination of the direction and magnitude of the circulating current is inadequate for recovering polar signals where full duplex signaling is provided.

It is also well known to utilize differential relay circuit arrangements to recover incoming signals on full duplex lines. These arrangements, however, are limited to very low-speed signaling and are relatively expensive and unreliable. It is, therefore, desirable to use electronic circuits and more specifically, to use solid-state circuitry for monitoring and detecting the incoming polar signals,

SUMMARY OF THE INVENTION

It is therefore an object of this invention to recover incoming polar current signals on a full duplex line.

It is another object of this invention to discriminate between incoming and outgoing polar current signals.

It is a further object of this invention to use solid-state electronic circuitry for monitoring and detecting incoming polar signals.

The present invention utilizes a detector circuit which monitors the line signals under control of the outgoing signals generated by the local transmitter. The detector circuit, which may take the form of a plurality of signal slicers, is capable of identifying the direction and the magnitude of the line current and thus determine whether both sets are sending marking, one set is sending spacing or both sets are sending spacing. An appropriate one of the outputs of the slicers is then selected in accordance with the outgoing signal being transmitted to enable identification of incoming signals from the cumulative incoming and outgoing signaling currents on the line.

It is a feature of this invention that a pair of differentially coupled signal slicers determine the direction of the line current and a further signal slicer detects a predetermined magnitude of circulating current. Specifically, in accordance with the illustrative embodiment of this invention, the direction of line current is detected by a pair of emitter coupled transistors. The predetermined magnitude of current is detected by a third transistor whose emitter is coupled to the common emitter circuit of the transistor pair by way of an impedance device which provides a voltage drop which determines the predetermined line current magnitude threshold. The impedance device advantageously comprises a diode which raises the bias of the transistor pair when the third transistor turns ON to turn OFF the slicer pair.

BRIEF DESCRIPTION OF THE DRAWING

The foregoing and other objects and features of this invention will be fully understood from the following description of an illustrative embodiment taken in conjunction with the accompanying drawing which discloses the details of circuits and equipment which cooperate to form a full duplex polar signaling system in accordance with this invention.

GENERAL DESCRIPTION

A specific arrangement for employing the present invention may comprise two stations, such as local station 1, and an identical remote station, generally indicated by block 2 in the drawing. The stations communicate with polar DC current by way of communication line 4, which, as shown in the drawing, comprises two metallic leads. Other communication media, of course, may be used that can accommodate polar signaling.

With respect to the arrangement shown in the drawing, each station sends a marking signal by applying current to line 4 by way of its corresponding terminal L1, which current returns via the remote station and line 4 to its terminal L2. Each station sends a spacing signal by applying current to line 4 via its corresponding terminal L2, with the return current from the remote station being applied to terminal L1.

When both stations are sending marking signals a voltage source at each station develops the current which is passed to its corresponding terminal L1. These marking voltages are in series and poled in the same direction and the marking currents are, therefore, aiding.

If one station is sending a spacing signal while the other station is transmitting a marking signal, the station sending the spacing signal provides a voltage reversal, which voltage is preferably three times the magnitude of the marking voltage. The spacing current is, therefore, opposing the marking current from the other station and, since this spacing current is developed by a voltage three times the magnitude of the marking voltage, the net result is a reversal of current which flows from terminal L2 of the station sending the spacing signal to terminal L1 of the station sending the marking signal and then, by way of terminal L2 of the latter station, back to terminal L1 of the former station.

In the event that both stations are sending spacing signals, the signal voltages at both stations are reversed, whereby aiding spacing current flows from the L2 terminal of each station to the L1 terminal of the other station. This aiding current is three times the magnitude of the spacing current developed when only one station is sending a spacing signal.

Considering now local station 1, the station generally includes a customer provided terminal or teletypewriter with appropriate interface circuitry, generally indicated by block 10 in the drawing, and, further, includes a transmitter 12, a three-level detector 14, a level shifter 15, a low-pass filter 16 and a slicer 17.

Outgoing signals are generated by terminal 10 and applied by way of lead 20 to transmitter 12. The incoming signals received by local station 1 are detected and applied to lead 28 to be recorded by terminal 10. If terminal 10 is sending a marking signal, lead 20 has applied thereto a voltage negative with respect to ground. This negative potential is passed to transmitter 12. Transmitter 12, in response to the negative marking signal, renders the potential on output lead 22 positive with respect to output lead 24. As described in detail hereinafter, this provides a current flow from transmitter 12 to terminal L1 by way of lead 30 under the assumed condition that both stations are sending marking signals. With a negative marking potential being applied to transmitter 12 by way of terminal 10, transmitter 12 applies a potential to output lead 21, which potential approaches ground. It is noted that lead 21 extends to level shifter 15. The function of this circuit and the effects of the ground potential on lead 21 are described hereinafter.

Return now to transmitter 12. It is recalled that the transmitter renders the potential on output lead 22 positive with respect to output lead 24 when sending a marking signal. If both stations are sending marking signals, current is, therefore, passed out of terminal L1 to terminal L2 of remote station 2 and then back from terminal L1 of the remote station to terminal L2 of local station 1, as previously described. This current then passes through lead 23, three-level detector 14 and then, by way of lead 24, back to transmitter 12. Of course, if the remote station is sending a spacing signal, the current on line 4 is reversed, as previously described, providing a current flow to remote station 2 by way of lead 24, three-level detector 14, lead 23 and terminal L2 of local station 1.

The function of three-level detector 14 is to sense the direction and magnitude of the current on line 4, determine the outgoing signal being transmitted by the local station and, in response thereto, develop a signal on output lead 26 corresponding to the input signal. The input lead which carries the information advising three-level detector 14 of the output signal comprises lead 25, which extends to level shifter 15. The input to level shifter 15 constitutes lead 21, as previously described. With transmitter 12 sending a marking signal, a ground potential is applied to lead 21 and level shifter 15, in response to the ground signal, passes a negative potential to three-level detector 14 by way of lead 25. This advises three-level detector 14 that a marking signal is being transmitted.

Assume now that the local station sends a spacing signal. In this event, terminal 10 removes the negative potential applied to lead 20. Transmitter 12, in response to the removal of the negative potential, renders output lead 22 negative with respect to output lead 24. As described in detail hereinafter, the magnitude of this spacing potential is approximately three times the magnitude of the marking potential previously described and, of course, the potential is reversed with respect to the marking potential. Accordingly, spacing current will flow from output lead 24 through three-level detector 14 and lead 23 to output terminal L2 of local station 1. The returning spacing current will pass through terminal L1, lead 30 and lead 22 back to transmitter 12. In addition, with the negative marking potential being removed from input lead 20 of transmitter 12 by terminal 10, output lead 21 is driven negative with respect to ground. Level shifter 15, in response to the negative potential on lead 21, removes the negative potential being applied to lead 25. This advises three-level detector 14 that the local station is sending a spacing signal.

With the local station sending a spacing signal and the remote station sending a marking signal, spacing current, of course, flows from lead 24 through three-level detector 14 to lead 23. If remote station 2 is sending a spacing signal and the local station is sending a marking signal, spacing current similarly flows from lead 24 through three-level detector 14 to lead 23. However, with local station 1 sending a marking signal, level shifter 15 passes the negative potential to three-level detector 14 via lead 25 whereas when local station 1 sends a spacing signal this negative potential is removed. Accordingly, three-level detector 14 is arranged to recognize whether the spacing current being passed therethrough is an outgoing or an incoming spacing signal, in a manner described in detail hereinafter.

In the event that both stations are sending spacing signals, the spacing current provided by transmitter 12 to line 4 aids the spacing current developed by remote station 2. The net effect of two spacing currents provides a magnitude more than twice as great as the effect provided by the spacing signal from only one station. Three-level detector 14 thereby detects this increased spacing current. At the same time, of course, level shifter 15 has removed the negative potential from lead 25, indicating that the local station is sending a spacing signal.

When both stations are sending a marking signal or when spacing current is flowing through line 4 and local station 1 is sending a spacing signal, three-level detector 14 determines that an incoming marking signal is being received. Upon recognition of this incoming marking signal, three-level detector 14 applies a negative potential to output lead 26. If the local station is sending a marking signal and the remote station is sending a spacing signal, three-level detector 14 recognizes the spacing current on line 4 as an incoming spacing signal and removes the negative potential applied to line 26. Similarly, if both stations are sending spacing signals, three-level detector 14 detects the increased magnitude of the spacing current and in response thereto removes the negative potential applied to output lead 26. The application of the negative potential to lead 26 indicates an incoming marking signal and, alternatively, the rise in the potential on lead 26 to ground indicates an incoming spacing signal. The signal voltages on lead 26 are passed by way of low-pass filter 16 and lead 27 to slicer 17. Low-pass filter 16 functions to filter out any transients of the signal current on line 4 which are detected by three-level detector 14 and passed to output lead 26.

Slicer 17 is arranged to accept the signal voltages on lead 27, appropriately shape these signals (such as squaring up the incoming marking and spacing signals) and then apply these signals by way of lead 28 to terminal 10. Specifically, slicer 17 accepts a negative marking signal and, in turn, applies a marking ground potential by way of lead 28 to terminal 10. Conversely, slicer 17 accepts a spacing signal voltage and in response thereto removes the ground applied to lead 28. These incoming signals applied by way of lead 28 are recorded by terminal 10.

DETAILED DESCRIPTION

Refer again to terminal 10. During the interval when the marking signal is transmitted negative battery is applied to lead 20, as previously described. As seen in terminal 10, this negative battery is passed by way of send contacts 101. Conversely, when a spacing signal is transmitted, send contacts 101 open, whereby the negative battery is removed from lead 20. These signals are then passed to the base of transistor Q15 in transmitter 12.

Assume now that a marking signal is being transmitted. The negative potential on lead 20 which is passed to the base of transistor Q15 turns the transistor ON. The potential at the collector of transistor Q15 thereupon rises due to current from ground by way of resistor R2 and the emitter-to-collector base of transistor Q15. This potential is applied to output lead 21 and to the base of transistor Q3 by way of resistor R3, turning ON the latter transistor. At the same time the drop in potential across resistor R2 is applied to the base of transistor Q1 and this transistor turns ON.

With transistor Q1 turned ON, the potential at its collector rises toward the level of the potential at its emitter, which latter potential is substantially at ground. As seen in the drawing, the emitter of transistor Q1 is connected to the emitter of transistor Q2. The base of transistor Q2 is connected to the junction of resistors R8 and R9, which, in turn, are arranged as a voltage divider connected between the collector of transistor Q1 and ground. It is thus seen that with the rise of potential on the collector of transistor Q1, the potential on the base of transistor Q2 similarly rises to turn OFF the latter transistor.

Similarly, the emitter of transistor Q3 is connected to the emitter of transistor Q4 and the base of transistor Q4 is connected to the junction of resistors R6 and R7, which resistors are arranged as a voltage divider between the collector of transistor Q3 and negative battery. Thus, with transistor Q3 turned ON, transistor Q4 is turned OFF. Accordingly, when local station 1 is sending a marking signal transistors Q1 and Q3 are turned ON and transistors Q2 and Q4 are turned OFF.

Since transistors Q1 and Q3 are turned ON, a current path is provided from ground through reversely poled diodes D11, the emitter-to-collector path of transistor Q1, resistor R10, diode D1, reversely poled diodes D2, breakdown diode D3, resistor R5, the collector-to-emitter path of transistor Q3 and reversely poled diodes D12 to negative battery. It is noted that diodes D1 and D2 preferably provide a predetermined voltage drop, such as 4 volts for example. Diode D1, therefore, may represent a plurality of diodes in series and reversely poled diodes D2 may similarly represent a plurality of diodes in series to attain the desired voltage drop. In any event, the total drop across diodes D1, D2 and D3 is approximately 4 volts during the transmission of a marking signal. Accordingly, lead 22 is rendered approximately 4 volts positive with respect to lead 24. If remote station 2 is at this time also sending a marking signal, marking current thus flows from lead 22 through resistor R13 and lead 30 to output terminal L1 and returns on terminal L2 lead 23 and through three-level detector 14 to lead 24. Of course, if the remote station is sending a spacing signal, the incoming spacing current overcomes the outgoing marking current, since this spacing current is provided by a source of potential at the remote station which is the reverse of the marking signal potential and approximately three times the magnitude. Accordingly, the resulting flow of current is incoming to terminal L1 and passes via lead 30, resistor R13, lead 22, diodes D1, D2 and D3, lead 24, and then through three-level detector 14 and lead 23 to the output terminal L2

Assume now that local station 1 is sending a spacing signal. This removes the negative potential applied to lead 20 by terminal 10. Ground is now applied to the base of transistor Q15 by way of resistor R1. This turns OFF transistor Q15. Negative battery is now applied to the base of transistor Q3 by way of resistor R4. In addition, this negative potential is also applied through resistor R3 to output lead 21. With transistor Q15 turned OFF, ground is now applied through resistor R2 to the base of transistor Q1. Accordingly, transistors Q1 and Q3 are turned OFF and the collector potential of transistor Q3 rises, rendering the base of transistor Q4 positive with respect to its emitter. At the same time the potential on the collector of transistor Q1 drops, rendering the base of transistor Q2 negative with respect to its emitter. Accordingly, transistors Q2 and Q4 are turn ON. Thus, when transmitter 12 is sending a spacing signal, transistors Q1 and Q3 are turned OFF, transistors Q2 and Q4 are turned ON, and a negative potential is applied to output lead 21.

With transistors Q2 and Q4 turned ON, a current path is provided from ground by way of reversely poled diodes D11, the emitter-to-collector path of transistor Q2, resistor R11, breakdown diode D3, diode D4, resistor R12, the collector-to-emitter path of transistor Q4 and reversely poled diodes D12 to negative battery.

Breakdown diode D3 is preferably arranged to break down at approximately 12 volts. Accordingly, the voltage drop across diodes D3 and D4 with transistors Q2 and Q4 turned ON is approximately 12 volts. This potential is thus applied across leads 22 and 24. It is noted that the voltage potential applied to leads 22 and 24 is reversed in polarity with respect to the marking signal and, in addition, the magnitude of the potential is approximately three times the magnitude of the marking signal. Accordingly, a spacing signal is transmitted, comprising current passed from lead 24 through three-level detector 14 and lead 23 to output terminal L2. The spacing current then returns on terminal L1 and passes through lead 30 and resistor R13 and to lead 22.

It is noted that if the local station is sending a spacing signal and the remote station is sending a marking signal the locally generated spacing potential source opposes the marking potential source generated by the remote station. The spacing voltage is, however, approximately three times the potential of the marking voltage source. The resultant current on line 4 is, therefore, spacing current having a magnitude reduced by the magnitude of the opposing marking current from the remote station. If both stations are concurrently sending spacing signals, the two spacing voltages are in aiding relationship. Compared with the situation where one station is sending a spacing signal and the other station is sending a marking signal, it can be seen that the magnitude of the spacing current where two stations are sending spacing is approximately three times the magnitude of the spacing current developed where one station sends spacing current and the other station sends opposing marking current.

As previously described, the current applied via lead 23 to line 4 is also passed through three-level detector 14. Specifically, leads 23 and 24 are connected by way of resistors R14 and R15 in three-level detector 14. Three-level detector 14 functions to detect the amount and direction of the current on the loop by sensing the magnitude and direction of the voltage drops across resistors R14 and R15, determine the outgoing signal being locally generated and thereby develop a signal corresponding to the incoming signal.

In three-level detector 14, transistors Q5, Q6 and Q7 detect the amount and direction of the current on the line loop. The base of transistor Q5 is connected by way of resistor R18 to lead 23. The base of transistor Q6 is connected by way of resistor R17 to the junction of resistors R14 and R15. Finally, the base of transistor Q7 is connected by way of resistor R16 to lead 24. The collector of transistor Q7 extends to negative battery by way of resistor R21. The collector of transistor Q6 is connected to negative battery by way of resistor R20. Finally, the collector of transistor Q5 is connected to negative battery by way of resistor R19. It is seen that the emitters of transistors Q6 and Q7 are connected together and then to ground by way of the collector-to-emitter path of transistor Q8 and resistor R37. Transistor Q8 operates as a constant current source, providing sufficient current to permit any one of transistors Q5, Q6 or Q7 to be fully turned ON. It is also seen that the collector of transistor Q8 is connected by way of diode D5 to the emitter of transistor Q5.

Consider first that marking current is being looped around line 4. In this event the potential on lead 23 is an increment more positive than the potential at the junction of resistors R14 and R15, which is, in turn, an increment more positive than the potential on lead 24. At the same time the loop potential is generally negative with respect to ground since it is included in the current path of transistors Q2 and Q3, which path, of course, extends, as previously described, from ground to negative battery. Accordingly, the negative potentials on leads 23 and 24 and on the junction of resistors R14 and R15 are applied to transistors Q5, Q6 and Q7, tending to turn ON these transistors. With transistor Q7 turned ON, however, the potential on its emitter tends to drop to the potential applied to its base. Since this potential is also applied to the emitter of transistor Q6 and further, since its base potential is positive with respect to the potential applied to the base of transistor Q7, transistor Q6 turns OFF. It is seen that the potential on the base of transistor Q5 is positive with respect to the potential on the emitters of transistors Q6 and Q7. Therefore, since the base-to-emitter junction, diode D5 and the common emitter circuit of transistors Q6 and Q7 are in series, transistor Q5 is turned OFF. Therefore, with marking current on the line loop, the transistor Q7 is turned ON and transistors Q5 and Q6 are turned OFF.

Assume now that one station is sending spacing while the other is sending marking. In this event the spacing current passing through three-level detector 14 renders the potential at the junction of resistors R14 and R15 an increment negative with respect to the potential on lead 24 and renders the potential on lead 23 an increment negative with respect to the potential at the junction of resistors R14 and R15. Since transistors Q5, Q6 and Q7 all tend to turn ON, it is seen that with transistor Q6 turning ON the consequent potential on its emitter will be negative with respect to the potential applied to the base of transistor Q7. Since the emitters are connected together, transistor Q7 thereupon turns OFF. At the same time the potential applied to the emitter of transistor Q6 is not sufficient to turn ON transistor Q5 due to the voltage drop across diode D5 and the emitter-to-base junction of transistor Q5 which drop is arranged to be substantially as great as the incremental voltage drop across resistor R15 under the condition that one station is sending marking and the other station is sending spacing. Thus, transistor Q5 is turned OFF. Accordingly, with one station sending spacing and the other station sending marking, transistor Q6 is turned ON and transistors Q5 and Q7 are turned OFF.

When both stations are sending spacing signals, the magnitude of the drop across each of resistors R14 and R15 approximately three times the magnitude of the potential drop when only one station sends spacing. Under this condition transistor Q5 tends to turn ON since the drop across diode D5 is arranged to be less than the triple incremental drop across resistor R15. At the same time the potential applied by the emitter of transistor Q5, with this transistor turned ON, to the emitter of transistor Q6 is negative with respect to the potential on the base of transistor Q6 since, as pointed out above, the drop across resistor R15 is now greater than the drop across diode D5. Accordingly, transistor Q6 is turned OFF and, for the same reasons, transistor Q7 is turned OFF. Thus, when both stations are sending spacing current, transistor Q5 is turned ON and transistors Q6 and Q7 are turned OFF.

Indications of the outgoing signals are passed to three-level detector 14 by level shifter 15 by way of lead 25. Level shifter 15 comprises diode D8, a delay network including resistors R27 and R28 and capacitor C1, and transistor Q11. The function of the delay network is to provide sufficient delay in the operation of level shifter 15 to compensate for the accumulative delays of transmitter 12 and the delay of line 4 to the loop around current signals.

When transmitter 12 goes from a spacing to a marking condition the potential on lead 21 rises from a negative potential towards ground. This rising potential is applied through diode D8 and, after a momentary delay, passed through the delay network of resistors R27 and R28 and capacitor C1 to the base of transistor Q11. Transistor Q11 thereupon turns ON, driving the collector potential negative since the emitter is connected to negative battery. Accordingly, upon the transmission of a marking signal and after a momentary delay, a negative potential is applied to lead 25.

Assume now that transmitter 12 sends a spacing signal. As previously described, the potential on lead 21 goes negative. This removes the relatively positive potential previously applied through diode D8. A negative potential is now applied to the base of transistor Q11 by way of resistor R23, delayed, of course, by the action of resistor R28 and capacitor C1. Consequently, after this momentary delay, transistor Q11 turns OFF. Accordingly, when transmitter 12 sends a spacing signal the negative potential applied to lead 25 is removed.

Assume now that both stations are sending mark. Under this condition, transistor Q7 is turned ON in response to marking current on the line and a negative potential is applied to lead 25. With a negative potential applied to lead 25, the collector output of transistor Q6 is overcome and the negative potential maintains transistor Q10 OFF. However, with transistor Q7 turned ON, the collector potential rises toward ground and this potential is applied to the base of transistor Q9. Since the emitter of transistor Q9 is connected to negative battery, the transistor turns ON, resulting in the application of a negative potential to its collector. The collector extends to output lead 26 and the application of a negative potential to output lead 26 indicates that an incoming marking signal has been detected on line 4.

If local station 1 is sending a marking signal and remote station 2 is sending a spacing signal, lever shifter 15 is applying a negative potential to lead 25, transistor Q6 is turned ON and transistors Q5 and Q7 are turned OFF. With transistor Q7 turned OFF the negative potential applied to the base of transistor Q9 via resistor R21 turns transistor Q9 OFF. With negative potential applied to lead 25 via level shifter 15 the rising potential on the collector of transistor Q6 is overcome and transistor Q10 is turned OFF. Thus, transistors Q9 and Q10 are both turned OFF and ground potential is applied to output lead 26 by way of resistor R22. The application of ground potential to output lead 26 indicates that an incoming spacing signal has been detected on line 4.

If the local station is generating a spacing signal and the remote station is sending a marking signal, the negative potential is removed from lead 25, transistor Q6 is turned ON and transistors Q5 and Q7 are turned OFF. Transistor Q9 is, therefore, turned OFF, as previously described. The output of transistor Q6 is no longer overcome, however, and with the transistor turned ON, the rising potential on the collector is applied to transistor Q10 to turn this latter transistor ON. As a consequence, a negative potential developed on the collector of transistor Q10 is applied to output lead 26, indicating that an incoming marking signal has been detected on the line.

When both stations are sending spacing signals, the negative potential is removed from lead 25 by level shifter 15, transistor Q5 is turned ON and transistors Q6 and Q7 are turned OFF. With transistors Q6 and Q7 both turned OFF negative potentials are applied to the bases of transistors Q9 and Q10 by way of resistors R21 and R20, respectively. Both transistors Q9 and Q10 are consequently turned OFF and a ground potential is passed to lead 26 by way of resistor R22, indicating that an incoming spacing signal has been detected on the line.

Summarizing the operation of three-level detector 14, when both stations are sending marking signals transistor Q7 is turned ON, when one station is sending a marking signal and the other station is sending a spacing signal transistor Q6 is turned ON and, alternatively, when both stations are sending spacing signals transistor Q5 is turned ON. When an outgoing spacing signal is being generated, transistor Q10 follows transistor Q6 to determine whether the remote station is sending a marking signal. When, however, an outgoing marking signal is being generated, the output of transistor Q6 is disabled by level shifter 15 and transistor Q9 now follows transistor Q7 to determine whether the remote station is sending a marking signal. Thus, three-level detector 14 is enabled to discriminate between incoming signals and outgoing signals.

As previously described, a negative potential is applied to lead 26 when an incoming mark signal is detected by three-level detector 14 and a ground potential is applied to lead 26 when an incoming spacing signal is detected. These signals are passed by way of low-pass filter 16 to lead 27. Low-pass filter 16 may comprise any conventional low-pass filter capable of filtering out line transients, high frequency noise, etc. In any event, lead 27 has applied thereto negative potential marking signals and ground potential spacing signals corresponding to the incoming line signals.

Lead 27 extends to the base of transistor Q12 in slicer 17. If a negative potential marking signal is on lead 27 transistor Q12 is, therefore, turned OFF. Negative potential is now passed by way of resistor R24 and diode D9 to the emitter of transistor Q13. The base of transistor Q13 is connected to the junction of resistors R25 and R26, which resistors form a voltage divider between negative battery and ground and the potential on the base of transistor Q13 under these conditions is arranged to be more positive than the potential on the emitter. Consequently, transistor Q13 turns ON, drawing collector current from ground by way of resistor R29. This lowers the potential applied to the base of transistor Q14 and this latter transistor also is turned ON. Accordingly, when incoming marking signals are detected, transistor Q14 turns ON, applying current by way of its emitter-to-collector path to output lead 28.

If an incoming spacing signal is detected, ground potential is applied by lead 27 to the base of transistor Q12, turning the transistor ON. This raises the potential through diode D10 to resistor R24. Diode D9 is now back biased, forcing the emitter potential of transistor Q13 to rise. As a consequence thereof, transistor Q13 turns OFF. Ground is now applied through resistor R29 to the base of transistor Q14. As a consequence transistor Q14 turns OFF. Accordingly, when an incoming spacing signal is detected, transistor Q14 turns OFF, removing the application of ground current to lead 28.

Lead 28 extends to the select magnet driver circuit 102 in terminal 10. Select magnet driver 102 may be any conventional circuit arranged to drive a select magnet or equivalent device which functions to provide the appropriate record of the incoming data. Accordingly, select magnet driver 102 functions to detect mark signals in response to ground current on lead 28 and functions to detect space signals in response to the removal of ground from lead 28 and record data corresponding to the detected mark and space signals. Accordingly, the incoming signals from remote station 2 are recorded by terminal 10.

Although a specific embodiment of this invention has been shown and described, it will be understood that various modifications may be made without departing from the spirit of this invention.

We claim:

1. In a full duplex data set including means for applying direct-current signals to a communication line and means jointly operated by the cumulative signaling current in said line and the means for applying direct-current signals to the line for recognizing incoming direct-current signals characterized in that said jointly operated means comprises at least two signal slicers, each having an input connected to the line, each of said signal slicers having a different slicing level and thereby operated for a different magnitude of line current, and means controlled by the signal applied to the line for disabling at least one of said signal slicers.

2. A full duplex polar signaling data system having at least two stations, each station having means for impressing current on a signaling line so that the direction of the current impressed by each station corresponds to the data signal being transmitted and the magnitude and direction of the cumulative line current is determined by the currents impressed by both stations, and means for recovering incoming signals, said recovering means comprising:

a three-level detector having a pair of output leads and having inputs connected to said line for detecting three different line current conditions with respect to magnitude and direction; and means responsive to said impressing means for selecting one or the other of said output leads in accordance with the direction of the impressed current.

3. A full duplex polar signaling data system in accordance with claim 2 wherein said three-level detector comprises a differentially coupled pair of signal slicers for determining the direction of the line current and a third signal slicer operated by a predetermined magnitude of line current for disabling the signal slicer pair.

4. A full duplex polar signaling data system in accordance with claim 3 wherein said differentially coupled pair of signal slicers comprise two emitter-coupled transistors, said output leads being connected to individual ones of the collectors of said transistors.

5. A full duplex polar signaling data system in accordance with claim 4 wherein said third signal slicer comprises a third transistor, the emitter of said third transistor being coupled to the common emitter circuit of said emitter-coupled transistors by way of an impedance device.

6. In a full duplex polar signaling data system, a three-level detector for detecting three different line current conditions with respect to magnitude and direction comprising a differentially coupled pair of signal slicers for determining the direction of the line current and a third signal slicer operated by a predetermined magnitude of line current for disabling the signal slicer pair.

7. In a full duplex polar signaling data system in accordance with claim 6 wherein said differentially coupled pair of signal slicers comprises a pair of emitter coupled transistors.

8. In a full duplex polar signaling data system in accordance with claim 7 wherein said third signal slicer comprises a third transistor, the emitter of said third transistor being coupled to the common emitter circuit of said emitter coupled transistor pair by way of an impedance device.

9. In a full duplex polar signaling data system in accordance with claim 8 wherein said impedance device comprises a diode.